United States Patent [19]
Hinds

[11] Patent Number: 6,105,699
[45] Date of Patent: Aug. 22, 2000

[54] HEAVY EQUIPMENT APPARATUS THAT INCLUDES UNDERCARRIAGE WITH MOBILE TILTING UPPER

[75] Inventor: Michael Hinds, Thibodaux, La.

[73] Assignee: Cameco Industries, Inc., Thibodaux, La.

[21] Appl. No.: 09/094,810

[22] Filed: Jun. 15, 1998

[51] Int. Cl.[7] .................................................. B62D 33/063
[52] U.S. Cl. .................................. 180/89.14; 180/89.13; 180/89.14; 403/123
[58] Field of Search .............................. 180/89.13, 89.14, 180/89.15; 296/190.01; 403/122, 90, 123; 280/6.15

[56] References Cited

U.S. PATENT DOCUMENTS

| | | | |
|---|---|---|---|
| 4,324,304 | 4/1982 | Hashimoto et al. | 180/9.52 |
| 4,326,571 | 4/1982 | Crawford | 144/34 E |
| 4,565,486 | 1/1986 | Crawford et al. | 414/729 |
| 4,650,017 | 3/1987 | Pelletier et al. | 180/9.1 |
| 4,679,803 | 7/1987 | Biller et al. | 280/6 H |
| 4,823,852 | 4/1989 | Langford | 144/3 D |
| 5,337,847 | 8/1994 | Woods et al. | 180/9.52 |
| 5,931,247 | 8/1999 | Peterson | 180/89.13 |

*Primary Examiner*—Paul N. Dickson
*Assistant Examiner*—Tony Winner
*Attorney, Agent, or Firm*—Garvey, Smith, Nehrbass & Doody, LLC

[57] ABSTRACT

A heavy equipment apparatus such as a feller buncher includes a mobile tilting undercarriage and a working upper that supports a boom and its working end portion. The undercarriage includes a frame and a deck with a spaced apart, generally parallel powered endless tracks for moving the undercarriage from one location to the other. A tower assembly is mounted on the deck of the frame and has a ball support rigidly attached thereto to define a rigid support with the frame. An upper is movably mounted to the undercarriage at the ball support with a tilting connection that enables the upper to tilt with respect to the undercarriage. A rotary bearing attached to the bottom of the upper enables the upper to rotate with respect to the undercarriage. A flange assembly forms the interface between the rotary bearing and the ball support. Extensible cylinders extend between the undercarriage and the flange assembly for articulating the upper relative to the undercarriage during use. An anti-rotation bar prevents relative rotation at the ball support between the flange assembly and the ball support.

22 Claims, 5 Drawing Sheets

HEAVY EQUIPMENT APPARATUS THAT INCLUDES UNDERCARRIAGE WITH MOBILE TILTING UPPER

CROSS-REFERENCE TO RELATED APPLICATIONS

Not applicable.

STATEMENT REGARDING FEDERALLY SPONSORED RESEARCH OR DEVELOPMENT

Not applicable

REFERENCE TO A "MICROFICHE APPENDIX"

Not applicable

BACKGROUND OF THE INVENTION

1. Field of the Invention

The present invention relates to crawler-type heavy equipment such as feller bunchers, backhoes, and the like that includes tracks or tires for transporting the apparatus from one location to the other and an upper that includes a cab, engine and hydraulics. The upper also supports a boom with a work implement at the free end of the boom such as a feller buncher, backhoe or the like. Even more particularly, the present invention relates to an improved heavy equipment apparatus with a tilting upper structure that features a ball support rigidly attached to the undercarriage deck wherein the upper rotatably connects to a flange assembly that tilts upon the rigid ball support.

2. General Background of the Invention

In the forestry industry, feller buncher devices are known that can work on the sides of hills, mountainsides, even though the terrain might be inclined a significant amount such as for example, between about 10°–45°. In such a situation, a piece of equipment must be rugged, able to cut and support trees, and at the same time maintain the operator in a substantially vertical position.

There are various commercially available heavy equipment designs that enable the heavy equipment to work on hills, mountainsides, and the like. Several of such heavy equipment undercarriages have been patented. The broad concept of a tilting arrangement between an undercarriage and a working upper is known in the art.

The Hashimoto U.S. Pat. No. 4,324,304 and the Crawford U.S. Pat. No. 4,326,571 disclose crawler-type undercarriages that can support an upper on a hill while maintaining the upper working portion of the apparatus in an upright position. The Hashimoto patent discloses a mobile carrier with laterally spaced apart traction means (such as spaced apart tracks), a work base adapted to be attached to a crown for rotation about an axis normal to the crown. The Hashimoto patent also provides a tilt mechanism joining the work base to the carrier for relative tilting movement between the base and the carrier.

The patent to Crawford discloses a mobile carrier wherein the tilt member is a ring provided with diagonally opposed holes adapted to receive pivots defining an orthogonal axis of the ring.

BRIEF SUMMARY OF THE INVENTION

The present invention provides an improved apparatus having an undercarriage with a mobile tilting upper that is simpler and more rugged than prior art type constructions.

The present invention provides an improved apparatus and upper and upper having fewer working parts.

The present invention provides a tilting mechanism that provides multiple 360° rotations of the boom with respect to the undercarriage in continuous rotational fashion if desired, providing a unique arrangement that protects hydraulic lines from limbs, rocks and debris while joining them to the upper at a rotary fluid coupling.

The present invention thus provides a heavy equipment apparatus that includes a mobile tilting apparatus having an undercarriage and a working upper that supports a boom and its working end portion such as a feller buncher, for example.

The undercarriage includes a frame with a deck and a pair of paced apart generally parallel endless tracks for moving the undercarriage from one location to another.

A structural tower assembly mounts upon the deck and extends upwardly therefrom. A rigid ball support is attached to the tower assembly so that the ball and tower assembly define a rigid support with the frame that carries the upper.

A working upper is movably mounted to the undercarriage at the ball support with a tilting connection that enables the upper to tilt with respect to the undercarriage. This enables the upper to be maintained in a generally upright position when the tracks are engaging an incline, such as the side of a hill or mountain.

A rotary bearing is attached to the bottom surface of the upper for enabling the upper to rotate with respect to the undercarriage. A hydraulic motor on the deck of the upper can be used to power such rotation. A rotary fluid coupling joins hydraulic lines of the upper with hydraulic lines of the undercarriage to enable 360° rotation of upper with respect to undercarriage.

A flange assembly forms an interface between the rotary bearing and the ball support. The flange assembly preferably is in the form of a two part construction that includes upper and lower flanges.

Each of the flanges has a narrowed diameter inner surface portion that is curved to conform to the outer surface of the ball support. The flange assembly includes an inner spaced curved surface of each flange that conforms to the outer surface of the ball support, the inner surface extending over a sufficient area of the outer surface of the ball support so that the ball support and the flange assembly do not separate during use. For example, the ball support can be about 24 inches in diameter. The upper flange can be about four to eight inches thick. The lower flange can be about four to eight inches thick.

A plurality of powered extensible supports are provided that extend in between the undercarriage and the flange assembly for articulating the upper relative to the undercarriage during use, enabling a powered tilting of the upper relative to the undercarriage by extension and retraction of the extensible supports.

An anti-rotation mechanism prevents rotation of the flange assembly relative to the ball support during use.

The tower assembly and ball support are preferably rigid and non-rotating portions of the frame.

The anti-rotation mechanism can include a rod member that connects between the ball support and the flange assembly that allows arc shaped movement of the flange assembly relative to the ball support along a path that extends along the outer surface of the ball support between its upper and lower ends.

The ball support preferably provides a vertical channel through which hydraulic flow lines can be routed to protect them from damage from trees, limbs, rocks, or debris.

The extensible members are preferably extensible hydraulic cylinders.

The extensible members are mounted to the frame with movable articulating connections, preferably ball and socket connections.

Each of the extensible members has end portions with ball and socket connections. This enables an interface to be formed between the ends of each extensible member and the frame and the flange assembly respectively.

BRIEF DESCRIPTION OF THE DRAWINGS

For a further understanding of the nature, objects, and advantages of the present invention, reference should be had to the following detailed description, read in conjunction with the following drawings, wherein like reference numerals denote like elements and wherein.

DETAILED DESCRIPTION OF THE INVENTION

Figure 1:
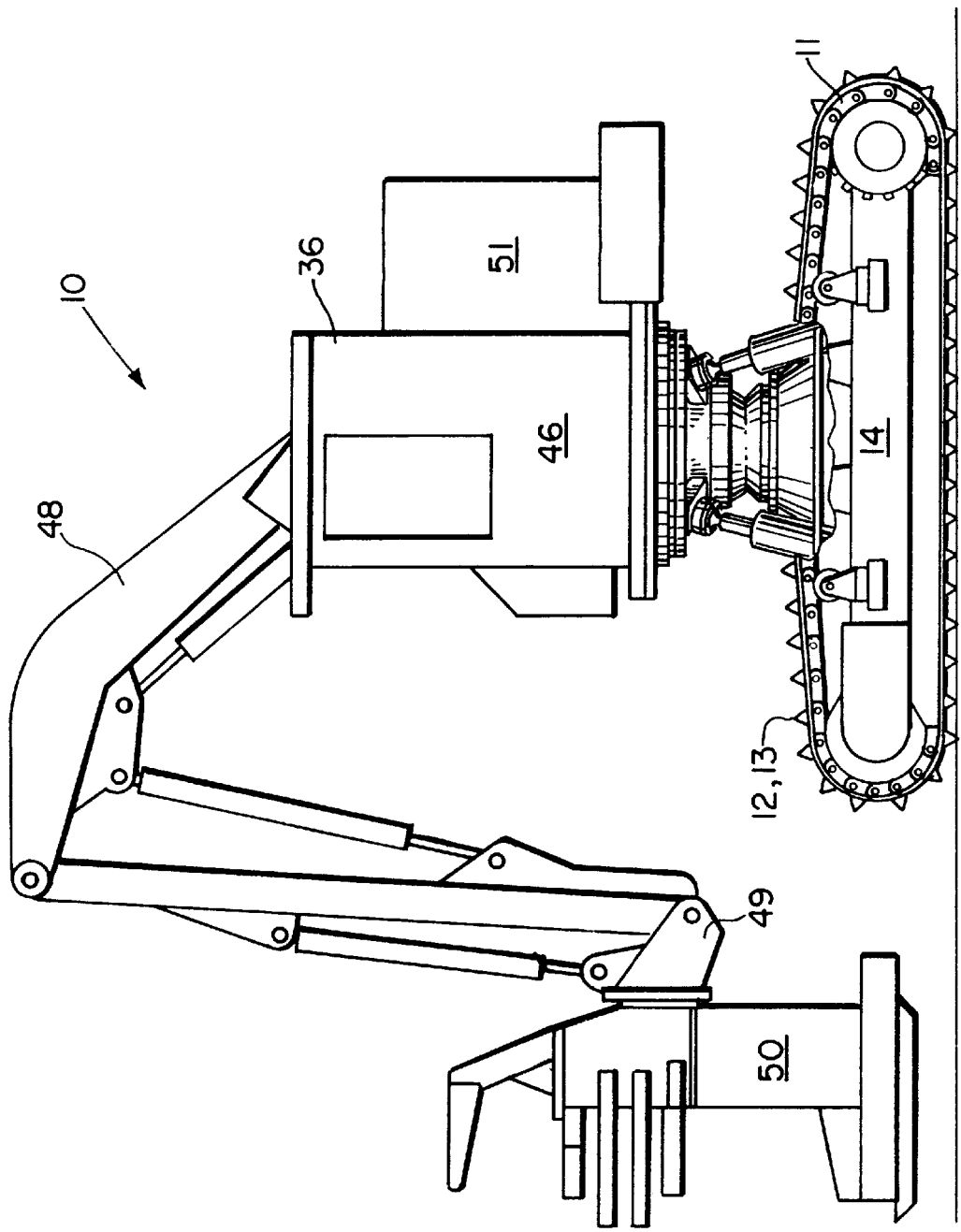
FIG. 1 is an elevational view of the preferred embodiment of the apparatus of the present invention.

FIGS. 1–6 show the preferred embodiment of the present invention designated generally by the numeral 10 in FIGS. 1–2 and 7–10. Heavy equipment apparatus 10 is shown in the form of a feller buncher apparatus 10 having an undercarriage 11 and an upper 36. The upper 36 thus includes a cab 46, an engine 51, a hydraulic system, boom 48, and feller buncher 50 at boom 48 end portion 49. Such a cab 46, engine 51, boom 48, and feller buncher 50 with a hydraulic system are all known in the art.

In FIGS. 1–6, undercarriage 11 includes a pair of endless tracks 12, 13 that are powered with an engine 51 such as a diesel engine and a hydraulic drive. The undercarriage 11 includes a platform 14 having a tower 15. The tower 15 can include a frustoconical section 16 and a circular plate 17.

Openings 18 in platform 14 are provided for enabling cylinders 42 to pass therethrough. Cylinder mounts 19 are provided below openings 18 for attaching the lower end portion of hydraulic cylinders 42 to the undercarriage 11 at platform 14 with ball and socket connections 43.

Ball mount 20 is a structurally sound, preferably integrally cast member that attaches at bolted connection 21 to tower 15 as shown in FIGS. 3–6. Circular plate 17 provides an opening 22 that communicates with a similar opening 23 extending vertically through ball mount 20. Ball mount 20 provides a generally flat upper annular surface 24. Rotary bearing 35 forms an interface in between upper 36 and undercarriage 11. The rotary bearing 35 is bolted to upper flange 33. The upper annular surface 24 surrounds opening 23 and communicates with opening 25 at the center of upper ring 33.

Figure 2:
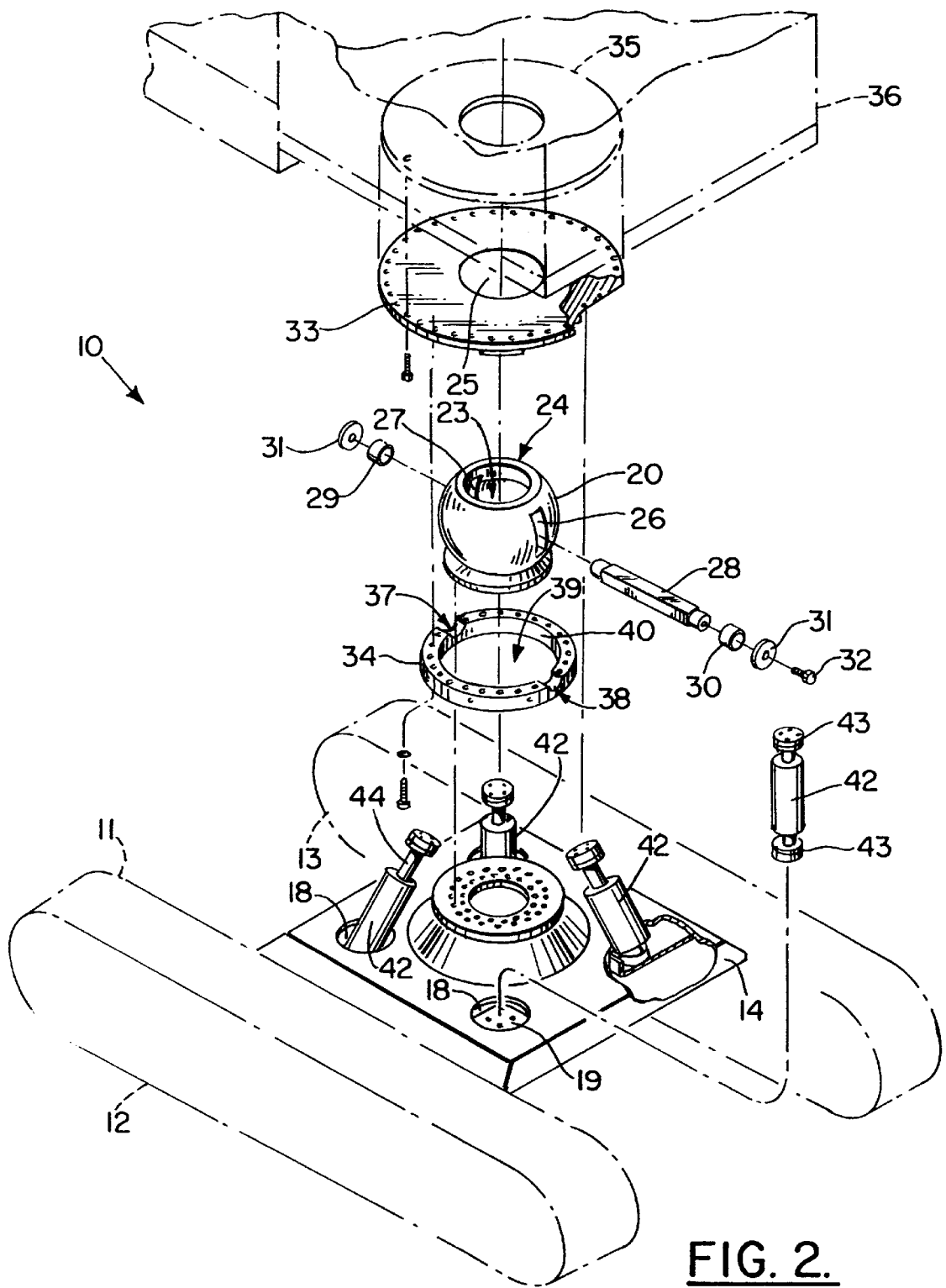
FIG. 2 is a fragmentary perspective exploded view of the preferred embodiment of the apparatus of the present invention.
Figure 3:
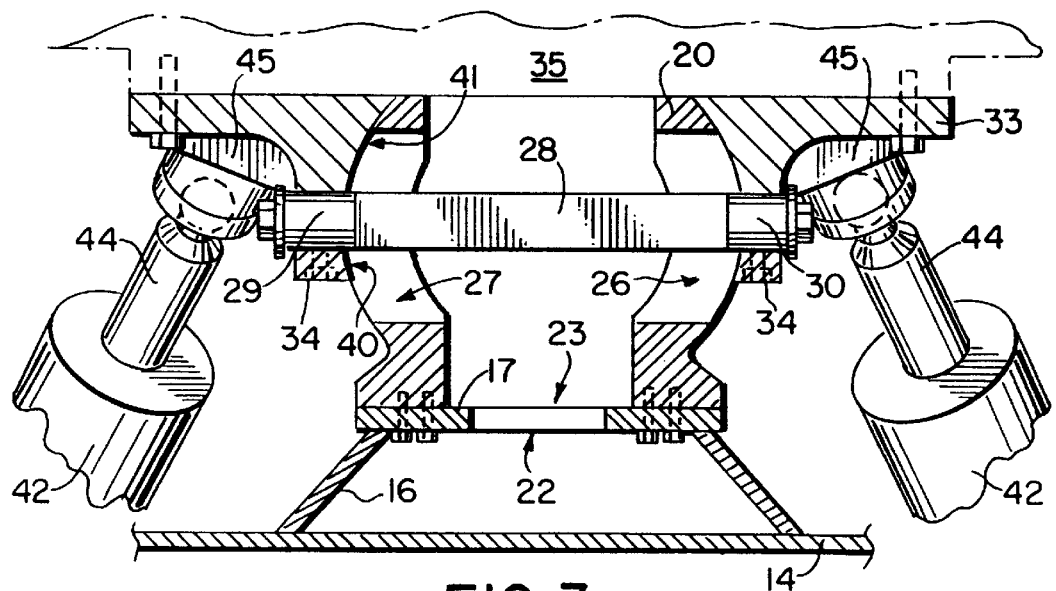
FIG. 3 is a partial sectional elevational view of the preferred embodiment of the apparatus of the present invention.
Figure 4:
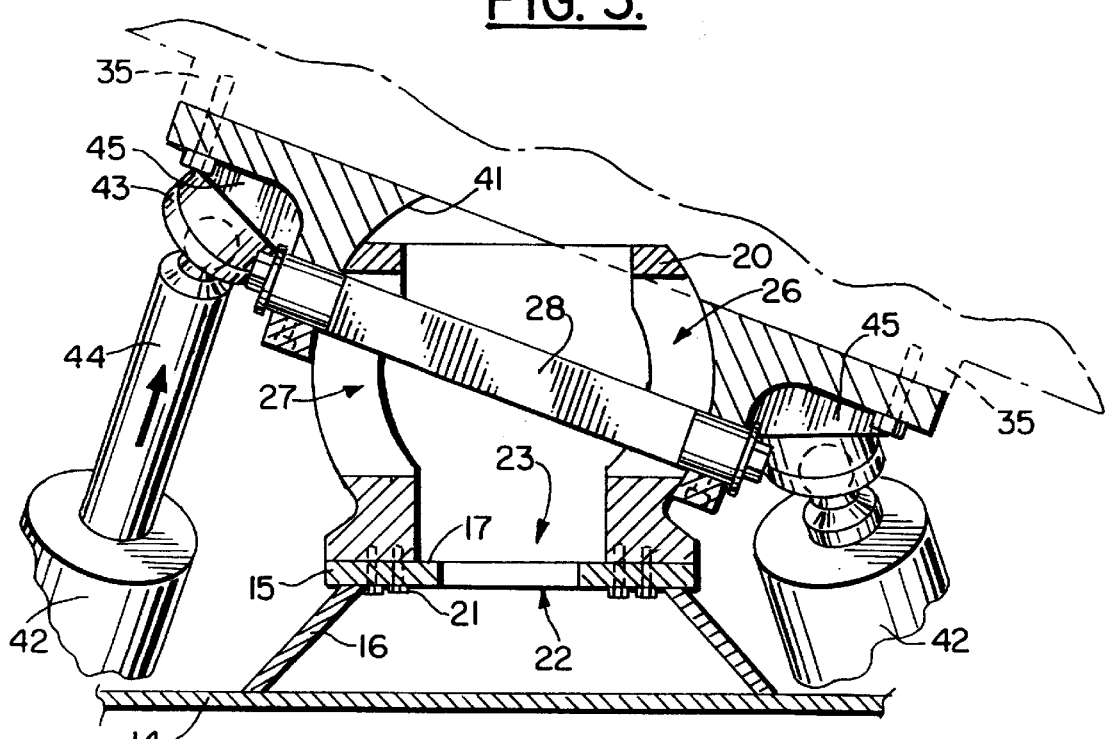
FIG. 4 is another partial sectional elevational view of the preferred embodiment of the apparatus of the present invention showing the upper in a tilted orientation relative to the undercarriage.
Figure 5:
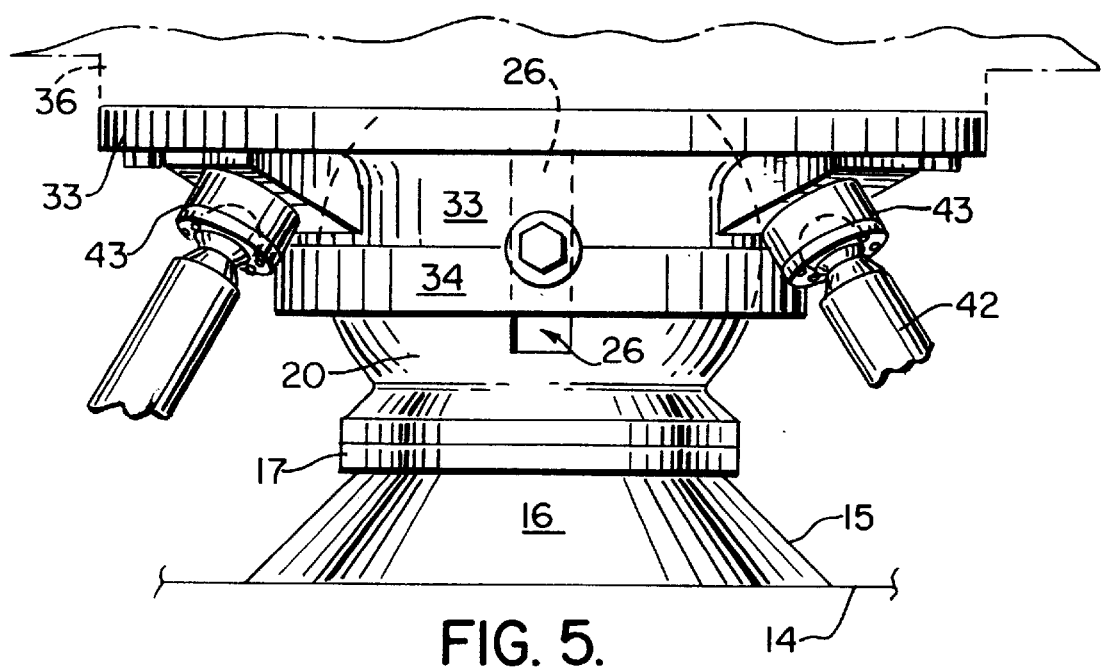
FIG. 5 is a fragmentary elevational view of the preferred embodiment of the apparatus of the present invention showing the upper in a position generally parallel to the undercarriage.
Figure 6:
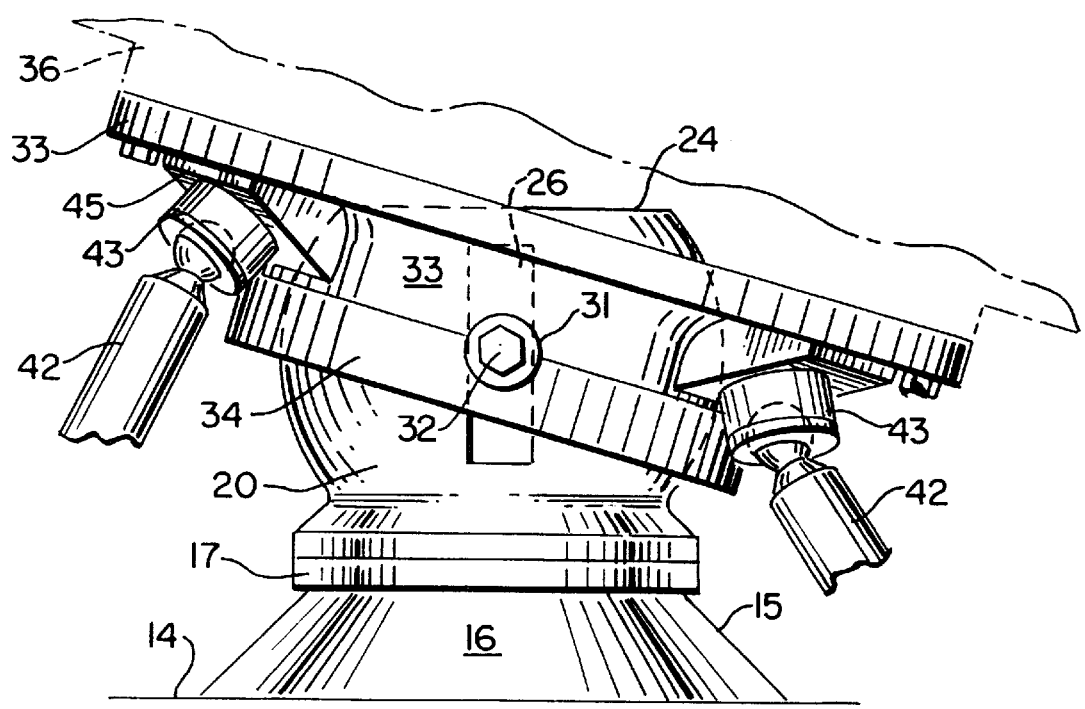
FIG. 6 is a partial elevational view of the preferred embodiment of the apparatus of the present invention showing the upper in a tilted position relative to the undercarriage.

A pair of vertically extending slots 26, 27 are formed in ball mount 20 as shown in FIGS. 2–4. Anti-rotation bar 28 extends through slots 26, 27. The anti-rotation 28 bar includes opposing end portions having bearings 29, 30. Each bearing 29, 30 can be attached to the end of anti-rotation bar 28 using washer 31 and bolt 32.

A flange assembly attaches to ball mount 20 and to the upper 36. This enables a universal articulation between the flange assembly and its attached upper 36 with the ball mount 20 and the undercarriage 11 to which ball mount 20 is rigidly mounted.

Universal articulation is provided by the flange assembly that is comprised of upper flange 33 and lower flange 34. The upper flange 33 bolts to a rotary bearing 35 that is attached to the bottom of upper 36 at the cab 46 portion thereof. Each of the upper and lower flanges 33, 34 of the flange assembly provides a generally U-shaped recess that receives one-half of the cylindrically-shaped bearing 29 and 30 at the end of anti-rotation bar 28.

In FIG. 2, U-shaped recesses 37, 38 on lower ring 34 receive the respective bearings 29, 30. Similar U-shaped recesses are provided on the underside of upper flange 33. These U-shaped recesses cradle the bearings 29 and 30 so that the anti-rotation bar 28 prevents rotation of the upper and lower flanges 33, 34 relative to ball mount 20. In this fashion, only the rotary bearing 35 provides a rotational interface in between the upper 36 and undercarriage 11.

The lower flange 34 provides an open center 39 and an inner surface 40 shaped so that the lower flange 34 conforms to the outer spherical surface of ball mount 30. Similarly, the upper flange 33 provides an open center 35 and an inner surface 42 that is shaped to enable the upper flange 33 to be assembled to the outer spherically-shaped surface of ball mount 20.

The uppermost surface of upper flange 33 at opening 25 provides a minimal diameter to the opening 25. Similarly, the bottom surface of lower flange 34 provides a minimal diameter of opening 39. This can be seen in FIGS. 3 and 4 wherein the upper and lower flanges 33, 34 respectively have been bolted together and are in operative position upon ball mount 20. In this fashion, the flange assembly is retained upon the ball mount 20 and cannot be removed therefrom until they are unbolted and disassembled therefrom.

Each hydraulic cylinder 42 includes ball and socket connections 43 at the end portions of the hydraulic cylinder 42. Each hydraulic cylinder 42 includes an extensible pushrod 44 as shown in FIGS. 3 and 4 that can extend and retract during tilting as shown in FIG. 4. Upper flange 33 provides a plurality of cylinder mounts 45 to which the ball and socket connections 43 are bolted as shown in FIGS. 3 and 4 or otherwise connected to the upper flange 33 at cylinder mounts 45.

Figure 7:
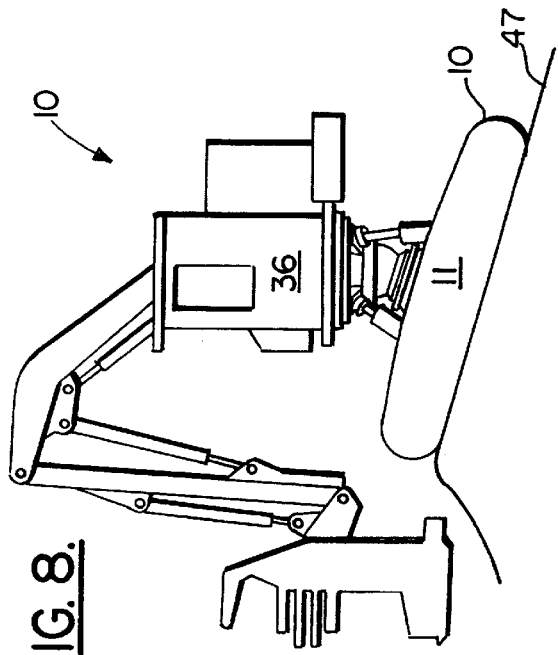
FIG. 7 is an elevational view of the preferred embodiment of the apparatus of the present invention showing the apparatus descending an incline.
Figure 8:
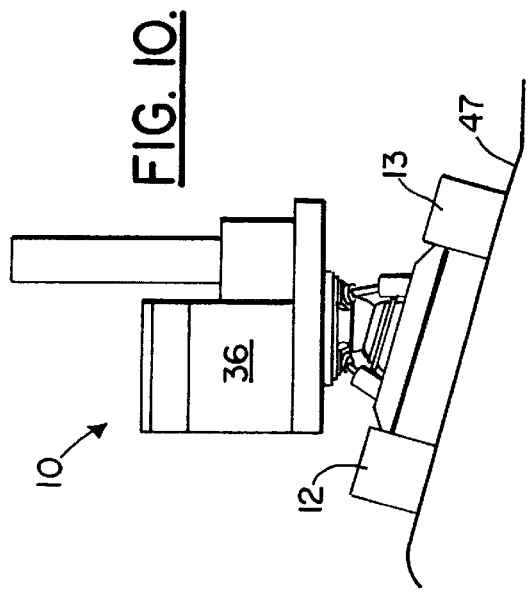
FIG. 8 is an elevational view of the preferred embodiment of the apparatus of the present invention showing the apparatus ascending an incline.
Figure 9:
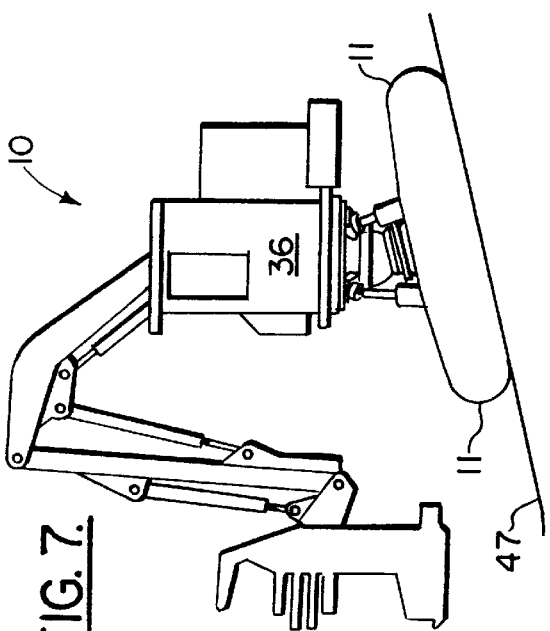
FIGS. 9–10 are elevational rear views of the preferred embodiment of the apparatus of the present invention shown on an incline that tilts one side of the undercarriage to a lower position and one side of the undercarriage to a higher position.
Figure 10:
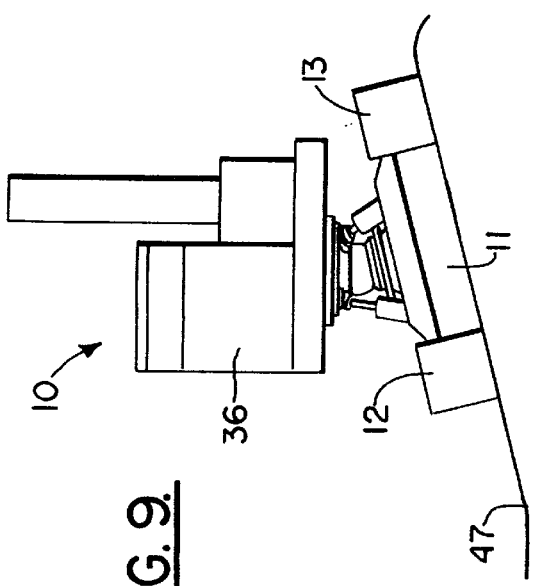

In FIGS. 7–10, the apparatus 10 of the present invention is shown on various inclines to illustrate the articulating tilting connection between the undercarriage 11 and the upper 36. In FIG. 7, the apparatus 10 is shown descending an incline 47. In FIG. 8, the apparatus 10 is shown ascending an incline 47. In FIG. 9, the apparatus 10 is shown traversing an incline 47 with the left track 12 lower than the right track 13. In FIG. 10, the apparatus 10 is shown traversing an incline 47 with the left track 12 elevated and the right track 13 at a lower position.

The following table lists the parts numbers and parts descriptions as used herein and in the drawings attached hereto.

PARTS LIST

| Part Number | Description |
| --- | --- |
| 10 | feller buncher |
| 11 | undercarriage |
| 12 | track |
| 13 | track |
| 14 | platform |
| 15 | tower |
| 16 | frustoconical section |
| 17 | circular plate |
| 18 | opening |
| 19 | cylinder mount |
| 20 | ball mount |
| 21 | bolted connection |
| 22 | opening |
| 23 | opening |
| 24 | upper annular surface |
| 25 | opening |
| 26 | vertical slot |
| 27 | vertical slot |
| 28 | anti-rotation bar |
| 29 | bearing |
| 30 | bearing |
| 31 | washer |
| 32 | bolt |
| 33 | upper flange |
| 34 | lower flange |
| 35 | rotary bearing |
| 36 | upper |
| 37 | U-shaped recess |
| 38 | U-shaped recess |
| 39 | open center |
| 40 | inner surface |
| 41 | inner surface |
| 42 | hydraulic cylinder |
| 43 | ball and socket connection |
| 44 | pushrod |
| 45 | cylinder mount |
| 46 | cab |
| 47 | incline |
| 48 | boom |
| 49 | boom end portion |
| 50 | feller buncher |
| 51 | engine |

The foregoing embodiments are presented by way of example only; the scope of the present invention is to be limited only by the following claims.

What is claimed is:

1. A heavy equipment apparatus that includes an undercarriage with a mobile, tilting working upper that supports a boom and its working end portion, comprising:

a) an undercarriage that includes a frame with a deck and a pair of spaced apart, generally parallel powered endless tracks for moving the undercarriage from one location to another;

b) a tower assembly mounted on the deck of the frame;

c) a ball support attached to the tower assembly so that the ball and tower assembly define a rigid, support with the frame;

d) an upper having a boom that is movably mounted to the undercarriage at the ball support with a tilting connection that enables the upper to tilt with respect to the undercarriage so that the upper can be maintained in a generally upright position when the tracks are engaging an incline such as the side of a hill or mountain;

e) a rotary bearing attached to the bottom surface of the upper for enabling the upper to rotate with respect to the undercarriage;

f) a flange assembly forming an interface between the rotary bearing and the ball support, the flange assembly including an inner spaced curved surface that conforms to the outer surface of the ball support, the inner surface extending over sufficient area of the outer surface of the ball support so that the ball support and flange assembly do not separate during use;

g) a plurality of powered extensible supports extending between the undercarriage and the flange assembly for articulating the upper relative to the undercarriage during use, enabling a powered tilting of the upper relative to the undercarriage by extension and retraction of the extensible supports;

h) an anti-rotation mechanism that prevents rotation of the flange assembly relative to the ball support during use.

2. The heavy equipment apparatus of claim 1 wherein the tower assembly and ball support are rigid and non-rotating portions of the frame.

3. The heavy equipment apparatus of claim 1 wherein the flange assembly includes upper and lower flanges.

4. The heavy equipment apparatus of claim 3 wherein each of the flanges has a narrow diameter inner surface portion.

5. The heavy equipment apparatus of claim 1 wherein the anti-rotation mechanism includes a member that connects between the ball support and the flange assembly that allows arc shaped movement of the flange assembly relative to the ball support along a path that extends along the outer surface of the ball support between its upper and lower ends.

6. The heavy equipment apparatus of claim 1 wherein the ball support has a vertical channel through which hydraulic flow lines can be routed.

7. The heavy equipment apparatus of claim 1 wherein the extensible members are extensible hydraulic cylinders.

8. The heavy equipment apparatus of claim 1 wherein the extensible members are mounted to the frame with ball and socket connections.

9. The heavy equipment apparatus of claim 1 wherein each extensible member has end portions with ball and socket connections for forming an interface between the ends of each extensible member, with the frame and the flange assembly respectively.

10. A heavy equipment apparatus that includes a mobile, tilting undercarriage and a working upper that supports a boom and its working end portion, comprising:

a) an undercarriage that includes a frame with a deck and a pair of spaced apart, generally parallel powered endless tracks for moving the undercarriage from one location to another;

b) a tower assembly mounted on the deck of the frame;

c) a ball support attached to the tower assembly so that the ball and tower assembly define a rigid, support with the frame;

d) an upper that is movably mounted to the undercarriage at the ball support with a tilting connection that enables the upper to tilt with respect to the undercarriage so that the upper can be maintained in a generally upright position when the tracks are engaging an incline such as the side of a hill or mountain;

e) a rotary bearing attached to the bottom surface of the upper for enabling the upper to rotate with respect to the undercarriage;

f) a flange assembly forming a load transfer interface between the rotary bearing and the ball support, the flange assembly including in inner spaced curved surface that conforms to the outer surface of the ball support, the inner surface extending over an area of the outer surface of the ball support so that the ball support and flange assembly do not separate during use;

g) a plurality of powered extensible supports extending between the undercarriage and the flange assembly for articulating the upper relative to the undercarriage during use, enabling a powered tilting of the upper relative to the undercarriage by extension and retraction of the extensible supports;

h) a slot extending through the ball; and i) a bar extending through the slot and attaching to the flange assembly at end portions of the bar for preventing rotation of the flange assembly relative to the ball support during use.

11. A heavy equipment apparatus that includes a mobile, tilting undercarriage and a working upper that supports a boom and its working end portion, comprising:

a) an mobile undercarriage that includes a frame with a deck;

b) a tower assembly mounted on the deck of the frame and extending upwardly therefrom, the tower assembly including a ball support, the tower assembly defining a rigid support with the frame;

c) an upper that is movably mounted to the undercarriage at the ball support of the tower assembly at a connection that enables the upper to tilt with respect to the undercarriage so that the upper can be maintained in a generally upright position when the tracks are engaging an incline such as the side of a hill or mountain;

d) a rotary bearing attached to the bottom surface of the upper for enabling the upper to rotate with respect to the undercarriage;

e) a flange assembly forming an interface between the rotary bearing and the ball support, the flange assembly including an inner spaced curved surface that conforms to the outer surface of the ball support, the inner surface extending over a sufficient area of the outer surface of the ball support so that the ball support and flange assembly do not separate during use;

g) a plurality of powered extensible supports extending between the undercarriage and the flange assembly for articulating the upper relative to the undercarriage during use, enabling a powered tilting of the upper relative to the undercarriage by extension and retraction of the extensible supports;

h) an anti-rotation mechanism that prevents rotation of the flange assembly relative to the ball support during use; and i) wherein the flange assembly transfers substantially all of the weight of the upper to the ball support with a sliding connection of the shaped inner surface of the flange assembly engaging the outer surface of the ball support.

12. A heavy equipment apparatus that includes an undercarriage with a mobile, tilting working upper that supports a boom and its working end portion, comprising:

a) a mobile undercarriage that includes a frame with a deck and a pair of spaced apart, generally parallel powered endless tracks for moving the undercarriage from one location to another;

b) a tower assembly mounted on the deck of the frame;

c) a ball support attached to the tower assembly;

d) a working upper that is movably mounted to the undercarriage at the ball support with a tilting connection that enables the upper to tilt with respect to the undercarriage so that the upper can be maintained in a generally upright position when the tracks are engaging an incline such as the side of a hill or mountain, the working upper having a boom;

e) a rotary bearing attached to the bottom surface of the upper for enabling the upper to rotate with respect to the undercarriage;

f) an annular interface member forming an interface between the rotary bearing and the ball support, the member including an in inner curved surface that conforms to the outer surface of the ball support, the inner surface extending over a sufficient area of the outer surface of the ball support so that the ball support and member do not separate during use;

g) a plurality of powered extensible supports extending between the undercarriage and the annular interface member for articulating the working upper relative to the undercarriage during use, enabling a powered tilting of the upper relative to the undercarriage by extension and retraction of the extensible supports;

h) an anti-rotation mechanism that prevents rotation of the annular interface member relative to the ball support during use.

13. The heavy equipment apparatus of claim 12 wherein the tower assembly and ball support are rigid and non-rotating portions of the frame.

14. The heavy equipment apparatus of claim 12 wherein the annular interface member comprises a flange assembly that includes upper and lower flanges.

15. The heavy equipment apparatus of claim 14 wherein each of the flanges has a narrow diameter inner surface portion.

16. The heavy equipment apparatus of claim 12 wherein the anti-rotation mechanism includes a member that connects between the ball support and the annular interface member that allows arc shaped movement of the annular interface member relative to the ball support along a path that extends along the outer surface of the ball support between its upper and lower ends.

17. The heavy equipment apparatus of claim 12 wherein the ball support has a vertical channel through which hydraulic flow lines can be routed.

18. The heavy equipment apparatus of claim 12 wherein the extensible members are extensible hydraulic cylinders.

19. The heavy equipment apparatus of claim 12 wherein the extensible members are mounted to the frame with ball and socket connections.

20. The heavy equipment apparatus of claim 12 wherein each extensible member has end portions with ball and socket connections for forming an interface between the ends of each extensible member, with the frame and the annular interface member respectively.

21. A heavy equipment apparatus that includes a mobile, tilting undercarriage and a working upper that supports a boom and its working end portion, comprising:

a) a mobile undercarriage that includes a frame with a deck, the undercarriage having rotary portions for moving the undercarriage from one location to another;

b) a tower on the deck of the frame;

c) a ball support attached to the tower so that the ball and tower define a support with the frame;

d) a working upper that is movably mounted to the undercarriage at the ball support with a tilting connection that enables the upper to tilt with respect to the undercarriage so that the upper can be maintained in a generally upright position when the undercarriage is engaging an incline such as the side of a hill or mountain;

e) a rotary bearing attached to the bottom surface of the working upper for enabling the upper to rotate with respect to the undercarriage;

f) a flange assembly forming a load transfer interface between the rotary bearing and the ball support, the flange assembly including in inner spaced curved surface that conforms to the outer surface of the ball support, the inner surface extending over an area of the outer surface of the ball support so that the ball support and flange assembly do not separate during use;

g) a plurality of powered extensible supports extending between the undercarriage and the flange assembly for articulating the upper relative to the undercarriage during use, enabling a powered tilting of the upper relative to the undercarriage by extension and retraction of the extensible supports;

h) a slot extending through the ball; and i) a bar extending through the slot and attaching to the flange assembly at end portions of the bar for preventing rotation of the flange assembly relative to the ball support during use.

22. A heavy equipment apparatus that includes a mobile, tilting undercarriage and a working upper that supports a boom and its working end portion, comprising:

a) an mobile undercarriage that includes a frame with a deck;

b) a tower assembly mounted on the deck of the frame and extending upwardly therefrom, the tower assembly including a ball support;

c) an upper that is movably mounted to the undercarriage at the ball support of the tower assembly at a connection that enables the upper to tilt with respect to the undercarriage so that the upper can be maintained in a generally upright position when the tracks are engaging an incline such as the side of a hill or mountain;

d) a rotary bearing attached to the bottom surface of the upper for enabling the upper to rotate with respect to the undercarriage;

e) a flange assembly forming an interface between the rotary bearing and the ball support, the flange assembly including an inner spaced curved surface that conforms to the outer surface of the ball support, the inner surface extending over a sufficient area of the outer surface of the ball support so that the ball support and flange assembly do not separate during use;

g) a plurality of powered extensible supports extending between the undercarriage and the flange assembly for articulating the upper relative to the undercarriage during use, enabling a powered tilting of the upper relative to the undercarriage by extension and retraction of the extensible supports;

h) an anti-rotation mechanism that prevents rotation of the flange assembly relative to the ball support during use; and i) wherein the flange assembly transfers substantially all of the weight of the upper to the ball support with a sliding connection of the shaped inner surface of the flange assembly engaging the outer surface of the ball support.

* * * * *